(12) United States Patent
Carpenter et al.

(10) Patent No.: US 9,725,031 B2
(45) Date of Patent: *Aug. 8, 2017

(54) VEHICLE SIGNAL CONTROL SYSTEM

(71) Applicant: Emergency Technology, Inc., Hudsonville, MI (US)

(72) Inventors: Kevin Carpenter, Hudsonville, MI (US); Kyle Israels, Hudsonville, MI (US); William S. Buehler, Hudsonville, MI (US); Michael Walma, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,390

(22) Filed: Feb. 2, 2016

(65) Prior Publication Data

US 2016/0144777 A1    May 26, 2016

Related U.S. Application Data

(63) Continuation of application No. 14/299,261, filed on Jun. 9, 2014, now Pat. No. 9,283,887.

(60) Provisional application No. 61/832,494, filed on Jun. 7, 2013.

(51) Int. Cl.
| | |
|---|---|
| *B60Q 7/02* | (2006.01) |
| *B60Q 1/52* | (2006.01) |
| *B60Q 1/46* | (2006.01) |
| *B60Q 1/26* | (2006.01) |
| *B60Q 1/50* | (2006.01) |
| *B60Q 1/00* | (2006.01) |

(52) U.S. Cl.
CPC ............. *B60Q 1/46* (2013.01); *B60Q 1/0088* (2013.01); *B60Q 1/26* (2013.01); *B60Q 1/2611* (2013.01); *B60Q 1/50* (2013.01)

(58) Field of Classification Search
CPC . B60Q 1/26; B60Q 1/46; B60Q 1/343; B60Q 1/50; B60Q 1/2611; B60Q 1/22; B60K 35/00; G08B 25/14
USPC ....... 340/472, 435, 438, 468, 479, 463, 464, 340/471, 902
See application file for complete search history.

(56) References Cited

U.S. PATENT DOCUMENTS

| | | | |
|---|---|---|---|
| 4,131,882 | A | 12/1978 | Hollabaugh et al. |
| 4,980,668 | A | 12/1990 | Leigh-Monstevens |
| 5,296,840 | A | 3/1994 | Gieffers |
| 5,422,623 | A | 6/1995 | Bader et al. |
| 5,583,479 | A | 12/1996 | Hettich et al. |

(Continued)

*Primary Examiner* — Hoi Lau
(74) *Attorney, Agent, or Firm* — McGarry Bair PC

(57) ABSTRACT

A vehicle control system includes, among other things, one or more functional warning units positioned in various positions in a vehicle. A central controller is configured to generate a desired state of the functional warning units and encode the desired state into a packet. Each of multiple remote controllers is functionally connected to at least one of the functional warning units. A functional connection between the central controller and the multiple remote controllers is configured to transmit the encoded packet from the central controller to each of the remote controllers. The remote controllers are configured to parse the desired state of each of the functional warning units in the encoded packet and set the state of each of the functional warning units based on the parsed encoded packet.

18 Claims, 5 Drawing Sheets

(56) References Cited

U.S. PATENT DOCUMENTS

| | | | |
|---|---|---|---|
| 5,659,289 A * | 8/1997 | Zonkoski | B60Q 1/2611 340/438 |
| 5,703,411 A | 12/1997 | Bella et al. | |
| 5,736,925 A | 4/1998 | Knauff et al. | |
| 6,020,814 A | 2/2000 | Robert | |
| 6,087,932 A | 7/2000 | Belgard | |
| 6,292,107 B1 | 9/2001 | Yamaura et al. | |
| 6,449,472 B1 | 9/2002 | Dixit et al. | |
| 2002/0030591 A1 | 3/2002 | Paranjpe | |
| 2003/0146828 A1* | 8/2003 | Su | B60R 1/025 340/438 |
| 2003/0189481 A1 | 10/2003 | Hamid | |
| 2008/0036582 A1* | 2/2008 | Farley | B60Q 1/2615 340/468 |
| 2008/0100432 A1* | 5/2008 | Hoffman | B60Q 1/46 340/475 |

* cited by examiner

VEHICLE SIGNAL CONTROL SYSTEM

CROSS-REFERENCE TO RELATED APPLICATION

This application is a continuation of U.S. application Ser. No. 14/299,261, filed Jun. 9, 2014, now issued as U.S. Pat. No. 9,283,887, which claims the benefit of U.S. Provisional Patent Application No. 61/832,494, filed Jun. 7, 2013, which are incorporated herein by reference in their entirety.

FIELD OF THE INVENTION

This invention relates generally to electrical control systems, and more particularly for controlling the visual and audible signaling systems located on vehicles.

BACKGROUND

One of the primary functions of a vehicle's signaling system is to draw the attention of motorists and pedestrians to the vehicle. Accomplishing this function provides safety to the driver of the vehicle and approaching motorists and pedestrians. The installation and coordination of the electronic visual and audible signaling devices is typically a resource-intensive process in terms of labor and materials. Each signaling module, such as needed for the control of a lightbar, perimeter lights, siren, headlight flashers, etc. must be hand-wired and then programmed with configurations, flash patterns, and priorities.

Integrated wiring harnesses and control systems have been used for vehicle signaling. Some examples of these types of control systems are disclosed in U.S. Pat. Nos. 5,422,623, 5,703,411, and 5,736,925 functional warning units Bader et al. U.S. Pat. No. 5,422,623 discloses an emergency signaling system for a vehicle that includes one or more signaling devices such as an emergency light located on a lightbar and a housing to enclose a first control unit necessary for delivering power to the signaling device. A second control unit remote from the first is electrically coupled to the electronics in the housing and stores and controls the signal patterns for the signaling devices. The control units are connected via a bus. Separate cabling from a battery carries power and reference ground wires to each of the control units.

Bella et al. U.S. Pat. No. 5,703,411 discloses a wiring harness and control system for vehicle functional warning units directed at easy and quick installation into vehicles. A control unit, mounted on the underside of the rear deck of the vehicle, couples to a user-controlled console. Branches of a wiring harness connected to the control unit are routed to the lightbar, the headlights, warning lights and grille light. The control unit contains a load shedder circuit that distributes fused power to the lighting system elements.

Dawson et al. U.S. Pat. No. 5,736,925 discloses a modular lighting control system for vehicle lighting control directed at a vehicle such as an ambulance. A central processor processes commands from a user-controlled interface to route power to each of the signaling devices under the control of the central processor. The signaling devices are modular in that they may be selectively coupled to the central processor for a custom installation where the selective coupling requires a wiring harness to connect each signaling device to the central processor.

SUMMARY OF THE INVENTION

An aspect of the invention relates to a method for controlling functional warning units on a vehicle containing multiple functional warning units that are controlled by a central controller and multiple remote controllers remote from the central controller that are connected to the controller and to the functional warning units. The method comprises: generating an input relating to a desired state of the functional warning units in the central controller, encoding the desired state of the functional warning units into a packet in the central controller; transmitting the encoded packet from the central controller to each of the remote controllers across a network, wherein each remote controller is functionally connected to at least one of the functional warning units; parsing the desired state of each of the functional warning units in the encoded packet at each of the remote controllers, and setting the desired state of each of the functional warning units at the remote controllers based on the parsed encoded packet. The central controller is configured as a single master node and the one or more remote controllers are configured as slave nodes on the network In another aspect, the invention relates to a vehicle control system. The vehicle control system comprises one or more functional warning units positioned in various positions in a vehicle, a central controller configured to generate a desired state of the functional warning units and encode the desired state into a packet, multiple remote controllers, each of which is functionally connected to at least one of the functional warning units and a functional connection between the central controller and the multiple remote controllers and configured to transmit the encoded packet from the central controller to each of the remote controllers wherein the functional connection is a network and the central controller is configured as a single master node and the multiple remote controllers are configured as slave nodes on the network. The remote controllers are configured to parse the desired state of each of the functional warning units in the encoded packet and set the state of each of the functional warning units based on the parsed encoded packet.

DETAILED DESCRIPTION

Figure 1:
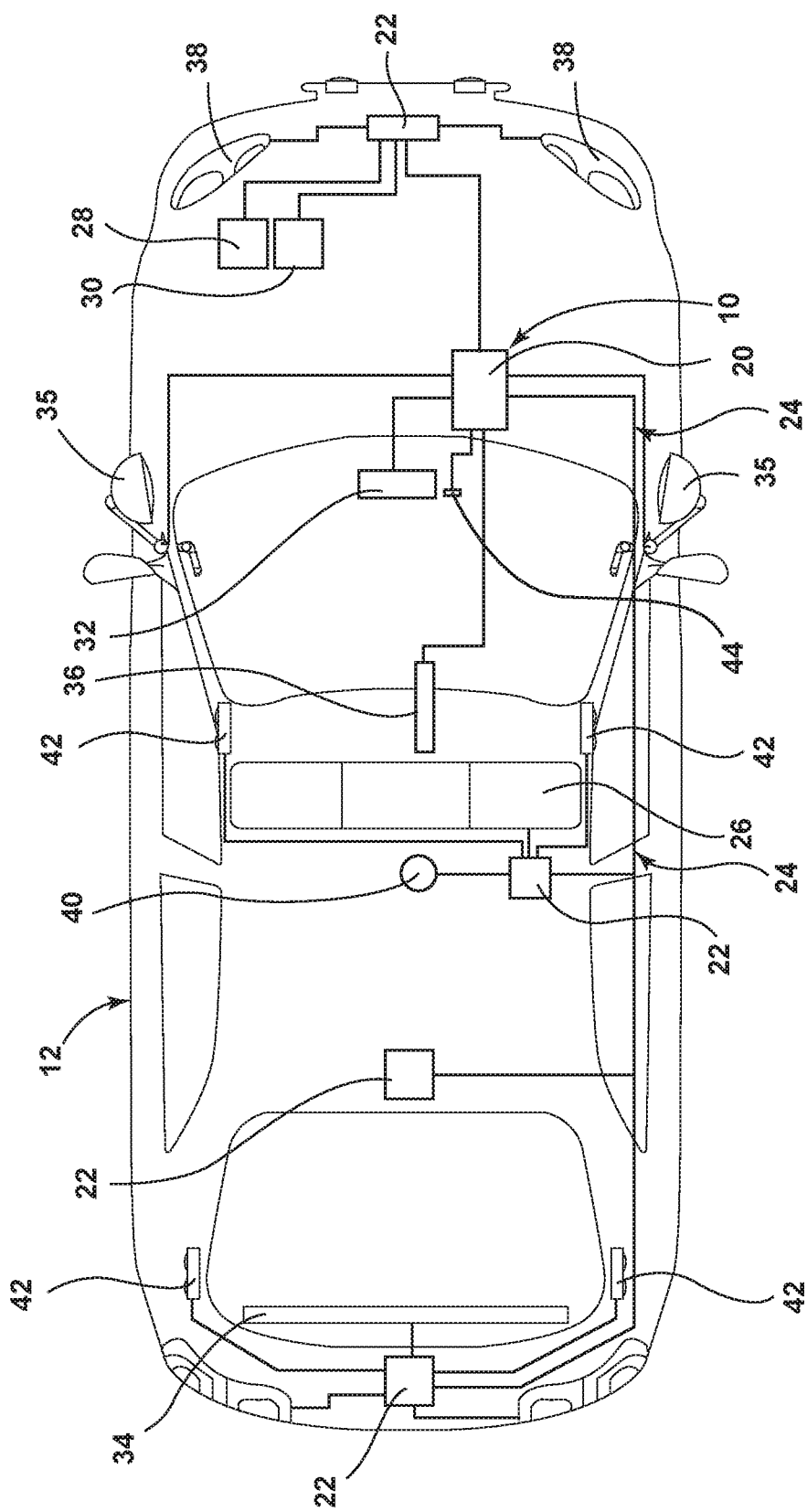
FIG. 1 is a top view of a vehicle with a modular, networked control system according to an embodiment of the invention.

Referring now to the drawings and to FIG. 1 in particular, a vehicle 12, such as an emergency vehicle, with a modular networked control system 10 is shown. The vehicle 12, in addition to the standard elements of a typical vehicle, includes functional warning units to aid in specialized tasks required of the vehicle and its operators. For example, one specialized task of an vehicle 12 is to provide active visual and audible warnings to attract the attention of motorists and pedestrians as the vehicle 12 approaches. As shown in FIG. 1, to provide active visual and audible warnings, the vehicle 12 may include a variety of functional warning units such as a lightbar 26, a siren 28, a horn 30, directional lighting 34, spotlights 35, headlight flashers 38, dash lights 40 and perimeter lighting 42. Other active functional warning units may be implemented depending upon the specific requirements necessary for the particular vehicle 12. Other active warning functional units may include public address systems, air horns, and load lights. While an "emergency vehicle" 12 is described, embodiments of the disclosure can be applied to any vehicles 12, including, but not limited to, land-based, sea-based, or air-based vehicles 12. Non-limiting examples of additional vehicles 12 can include, for instance, cars, trucks, semi-trucks, cargo carriers, boats, aircraft, and trains. Furthermore, as used herein, a vehicle 12 does not need to include an independent propulsion system, and can include, for example, train box cars, barges, trailers, or semi-trailers.

All of the vehicle lights and other vehicle functional warning units may be connected to the modular networked control system 10 and controlled in part by a user-interface on a control panel 32, preferably located at or near the console of the vehicle 12. Alternatively, the control panel 32 may be implemented by a smart phone or tablet—either wired or wirelessly. Any device capable of providing a human-machine interface (HMI) may be used as the control panel 32 depending upon the particular implementation of the invention. Other devices for providing HMI may include a purpose-built touch panel device specifically for vehicles or a multi-button console control head.

To control and coordinate the active warning devices, a modular networked control system 10 further may be integrated into the vehicle 12. A modular networked control system 10 may further include a central controller 20 communicatively coupled to one or more remote controllers 22 via a network connection. As shown in FIG. 1 the network connection may preferably be a Local Interconnect Network (LIN) 24. Other networks may be implemented, for example, a Controller Area Network (CAN) or a wireless local area network (WLAN).

The LIN 24 is a broadcast serial network connecting a single master node with one or more slave nodes. All messages on the LIN 24 are initiated by the master node with a single slave node replying to a given transmitted message. Communications across the LIN 24 may be carried at a 19.2 kbits/s data rate though other data rates may be implemented. The master and slave nodes are typically implemented as a microcontroller but may alternatively be implemented as application-specific integrated circuits (ASICs).

Integrated into the central controller 20, the master node of the LIN 24 initiates communications with the slave nodes that are integrated into each remote controller 22. The network topology, or organizational hierarchy of the interconnected nodes on the LIN 24, may be any network that enables communications between the central controller 20 and the remote controllers 22. In one implementation, the network topology is a star network where all the slave nodes in the remote controllers 22 are directly connected to the master node in the central controller 20. However, other network topologies such as a tree topology may be implemented to allow for remote controllers 22 to be daisy-chained such that some of the slave nodes of the remote controllers 22 are communicatively coupled to the central controller 20 through the slave nodes of other remote controllers 22.

The vehicle 12 functional warning units controlled by the modular networked control system 10 may be connected to the outputs of either the central controller 20 or any of the remote controllers 22. Functional warning units such as the lightbar 26, siren 28 and horn 30 may preferably be directly connected to the central controller 20 whereas the directional light 34 or the headlight flashers 38 may be directly connected to one of the remote controllers 22. The interoperability provided by the modular networked control system 10 enables vehicle 12 functional warning units to be connected to the controller deemed most accessible. This system enables short cable lengths to the controlled vehicle 12 functional warning units to boost drive intensity, simplify and speed installation, and reduce harness weight and cost.

The vehicle 12 functional warning units operably controlled by the modular networked control system 10 may not be limited to visual and audible warning devices. For example, a gun rack 36 may be selectively locked and unlocked by a solenoid connected to either the central controller 20 or a remote controller 22. Any 12-volt accessory socket 44 or device may be operably controlled in the same manner; energized or de-energized according to an output of either the central controller 20 or a remote controller 22.

Regardless of the particular network topology of the LIN 24, the configuration of the central controller 20 and the remote controllers 22 on the LIN 24 asserts a modular design whereby additional remote controllers 22 may be plugged into the network without reconfiguration of previously installed elements of the networked system, particularly the central controller 20. Installation of additional remote controllers 22 requires a single power connection to be run from a power source to the additional remote controller 22. Additional vehicle 12 functional warning units may con- nected to the additional remote controller 22 without an additional wiring harness being run back to the central controller 24. In one aspect of the invention, the ready addition of new remote controllers 22 and the ability to plug into the networked system provides for a highly scalable implementation.

Figure 2:
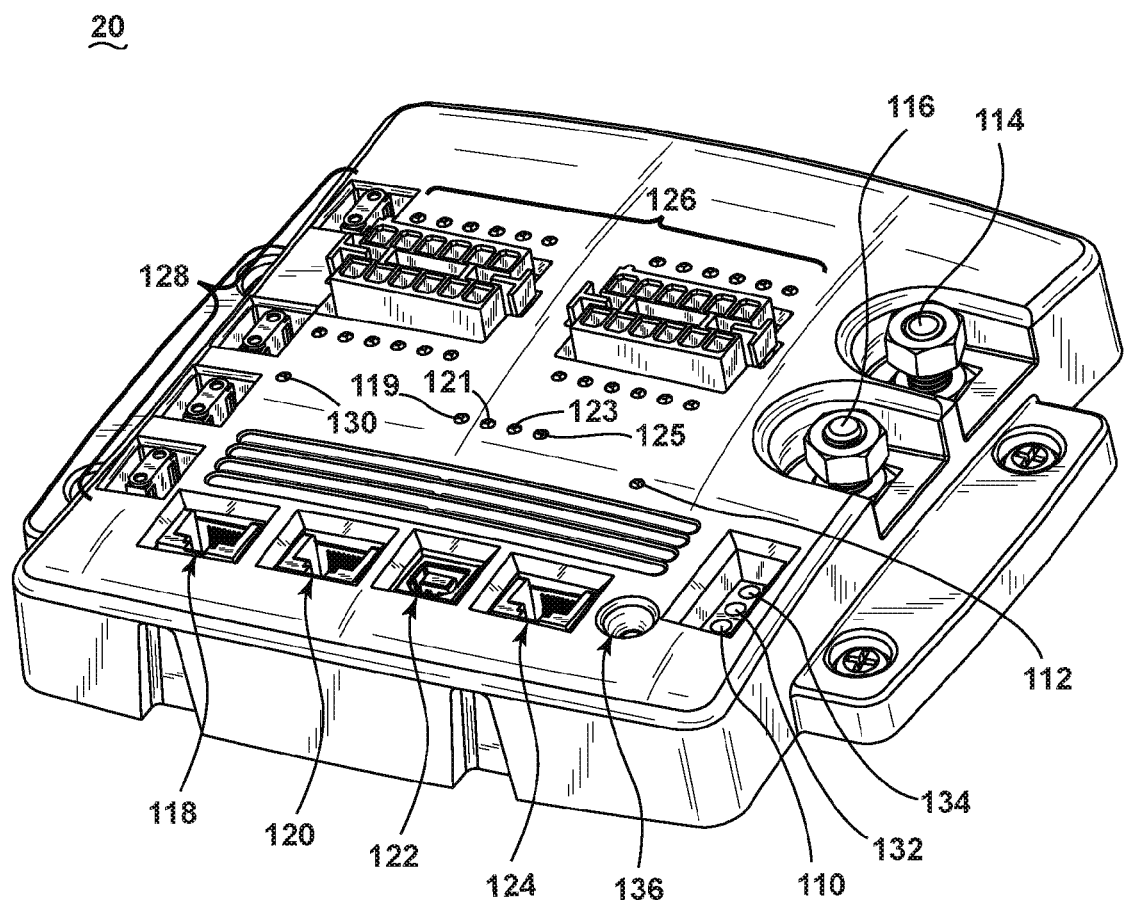
FIG. 2 is an isolated perspective view of the central controller of FIG. 1.

Referring now to FIG. 2, the central controller 20 may now be described. The central controller 20 is an electrical device that includes a number of electrical connections for providing energy to remotely connected devices including directly connected vehicle 12 functional warning units. Additionally, the central controller 20 provides communication to remote controllers 22 coupled to the remote LIN communications port 110. A LIN status LED 112 may be provided for visual confirmation of the status of the network connection.

Power may be provided to the central controller 20 by power input connections further including, for example, a +12 Vdc connection 114 and a chassis ground connection 116. Preferably, the power input connections are further connected to a car battery, though other power sources may be considered such as the alternator or a generator.

In addition to the LIN communications port 110, other communications ports may be implemented. For example, a lightbar communications port 118 may provide a direct communications channel between the lightbar 26 and the central controller 20. Using this port, the lightbar 26 may directly communicate with the central controller 20. Likewise, a siren communications port 124 may be implemented. Both the lightbar communications port 118 and the siren communications port 124 may be provided in tandem with status LEDs 119, 125 for visual confirmation of the status of the lightbar 26 and the siren 28.

The control panel 32 may be connected to the central controller 20 by the control panel port 120. As previously described, the control panel 32 may provide an HMI for connecting a user to the signaling system for operation of the vehicle 12 functional warning units. A control panel status LED 121 may provide a visual indication as to the status of the control panel 32.

A power status and/or fault LED 130 may be provided to visually indicate the overall status of the central controller 20. Alternatively, the power status and/or fault LED 130 may indicate a system fault. For example, the power status and/or fault LED 130 may flash according to a pattern that indicates a diagnostic code in the event of a fault.

A plurality of switched power outputs 126 each with a status LED allow for a number of additional direct connections between the central controller 20 and vehicle 12 functional warning units. A microprocessor in the central controller 20 may selectively power any of the switched power outputs 126 according to the design of a particular signaling pattern or user-selected state by way of the control panel 32. Other inputs to the system including those connected directly to the remote controllers 22 and user-initiated inputs may also determine in part the signaling patterns. While any number of switched power outputs 126 may be integrated into the central controller 20, in one preferred implementation, the central controller 20 includes twenty switched power outputs.

A plurality of constant power outputs 130 each with a status LED allow for a number of additional direct connections between the central controller 20 and vehicle 12 functional warning units that need to always have access to power. For example, a police cruiser may have a radio that is manually switched at the console of the vehicle. While any number of constant power outputs 130 may be integrated into the central controller 20, in one preferred implementation, the central controller 20 includes four constant power outputs.

Additional inputs to the central controller 20 beyond the control panel communications port 120 include an ignition input 132, an auxiliary input 134 and the current state of the emergency functional warning units. These additional inputs provide alternative conditions such that the microcontroller may initiate signaling patterns either by communications across the LIN 24 or to directly connected switched outputs 126 in response to the current state of, for example, the ignition switch or any of the emergency functional warning units.

Figure 3:
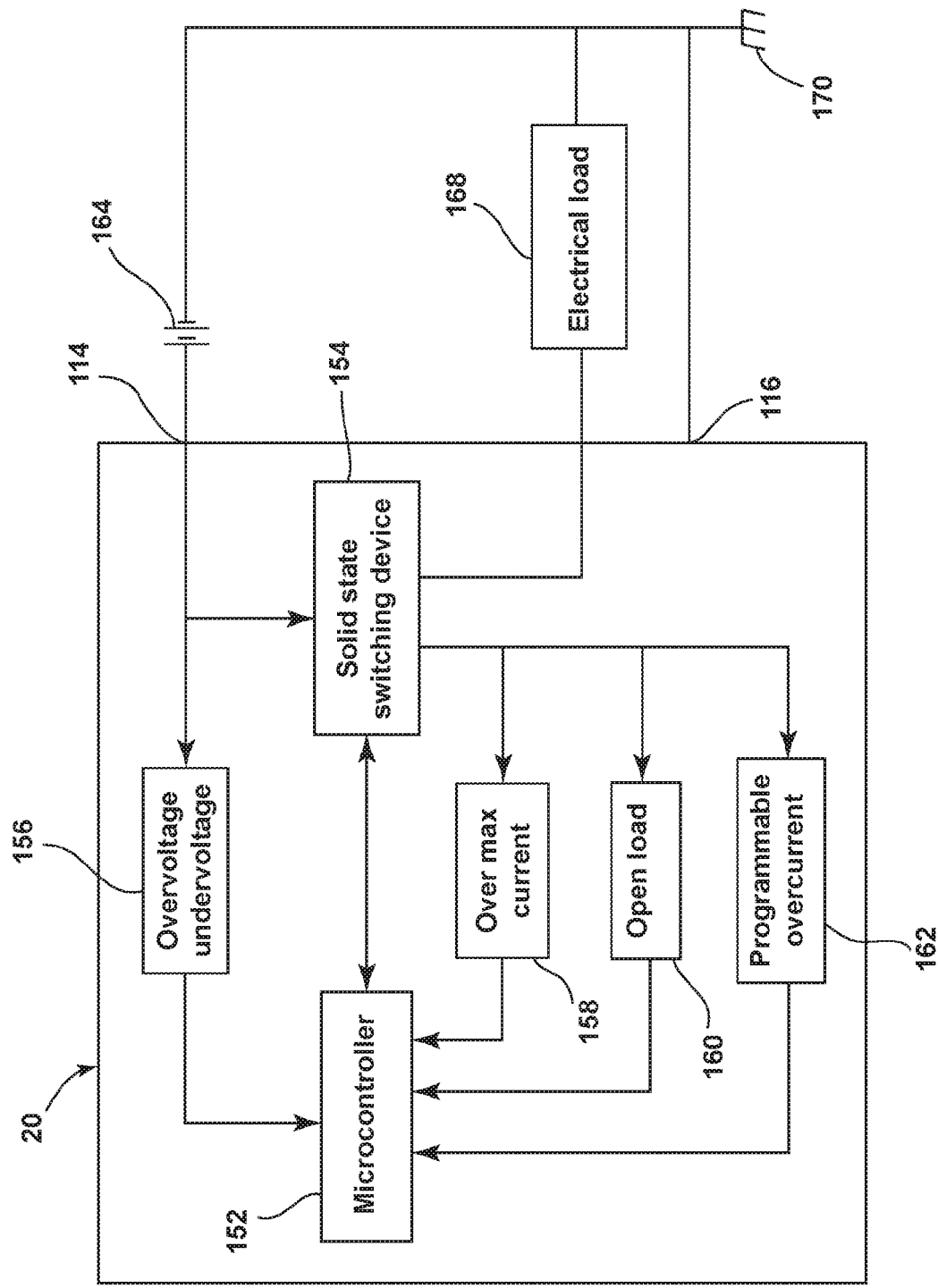
FIG. 3 is a schematic view of the central controller of FIG. 2.

Referring now to FIG. 3, the central controller 20 may preferably include solid-state electronic components including a microprocessor 152 for processing user inputs, connecting and managing the network and network communications and coordinating the warning signals such as flashing patterns of the relevant 12 functional warning units. Coupling the microprocessor 152 to both a power source 164 such as a 12 Vdc battery, and the electrical load 168, a solid-state switching device 154 may enable protective and diagnostic functions by provision of overvoltage and undervoltage detection 156, over maximum current detection 158, open load detection 160 and programmable overcurrent detection 162. The electrical load may further include both the inputs to the central controller 20 and the powered outputs such as the vehicle 12 functional warning units controlled by the central controller 20 and may be connected to chassis ground 170 as necessitated by the particular implementation.

The overvoltage and undervoltage detection 156 may detect when the voltage supplied to the central controller 20 is above or below the voltage range at which the central controller 20 is designed to operate such as may occur during a power surge. The over maximum current detection 158 may similarly detect when the current exceeds a specific current value such as may occur in a short circuit. The open load detection 160 may detect a no-load impedance indicative of an electrical disconnect between the central controller 20 and the electrical load 168.

The programmable overcurrent detection 162 may detect the presence of excess or larger than intended electric current along a conductor in the solid-state switching device 154 often indicative of a short circuit or an excessive electrical load. In contrast to the over maximum current detection 158, the threshold used to determine whether the detected current level is excessive may be dynamic such that a programmable threshold may be implemented and adjusted based in part upon the electrical characteristics of the particular electrical load coupled to the controller. The electrical load and it corresponding electrical characteristics may be characterized by the particular vehicle 12 functional warning units connected to the central controller 20.

By integrating a solid-state switching device 154 into the central controller 20 or a remote controller 22, the overall reliability of the control system is improved without the need for electromechanically operated relays or fuses. For example, the overcurrent detection features may eliminate the need for a fused circuit element, thereby eliminating the need for manual replacement of a fuse to restore operation of the modular networked control system in the event of a system fault.

To communicate across the LIN 24, the central controller 20 may initiate communication with one or more of the remote controllers 22 according to a communications protocol that defines the format and syntax of the communicated data as well as the rules for data exchange between nodes of the network. According to the communications protocol of the present invention, the central controller 20 may initially transmit a data packet. The data packet may be received by every remote controller 22 on the LIN 24 and, according to an instruction embedded in the data packet, a specific remote controller 22 may reply with a second data packet to the central controller 20. The combination of the initial data packet transmitted by the central controller 20 and the response packet transmitted by the indicated remote controller 22 may indicate a data frame. The time required to complete a data frame dictates the refresh rate of the network communication. In a preferred embodiment of the modular networked control system 10, the refresh rate is approximately 10 milliseconds (ms) though other refresh rates may be implemented depending upon the design goals of a particular system.

Figure 4:
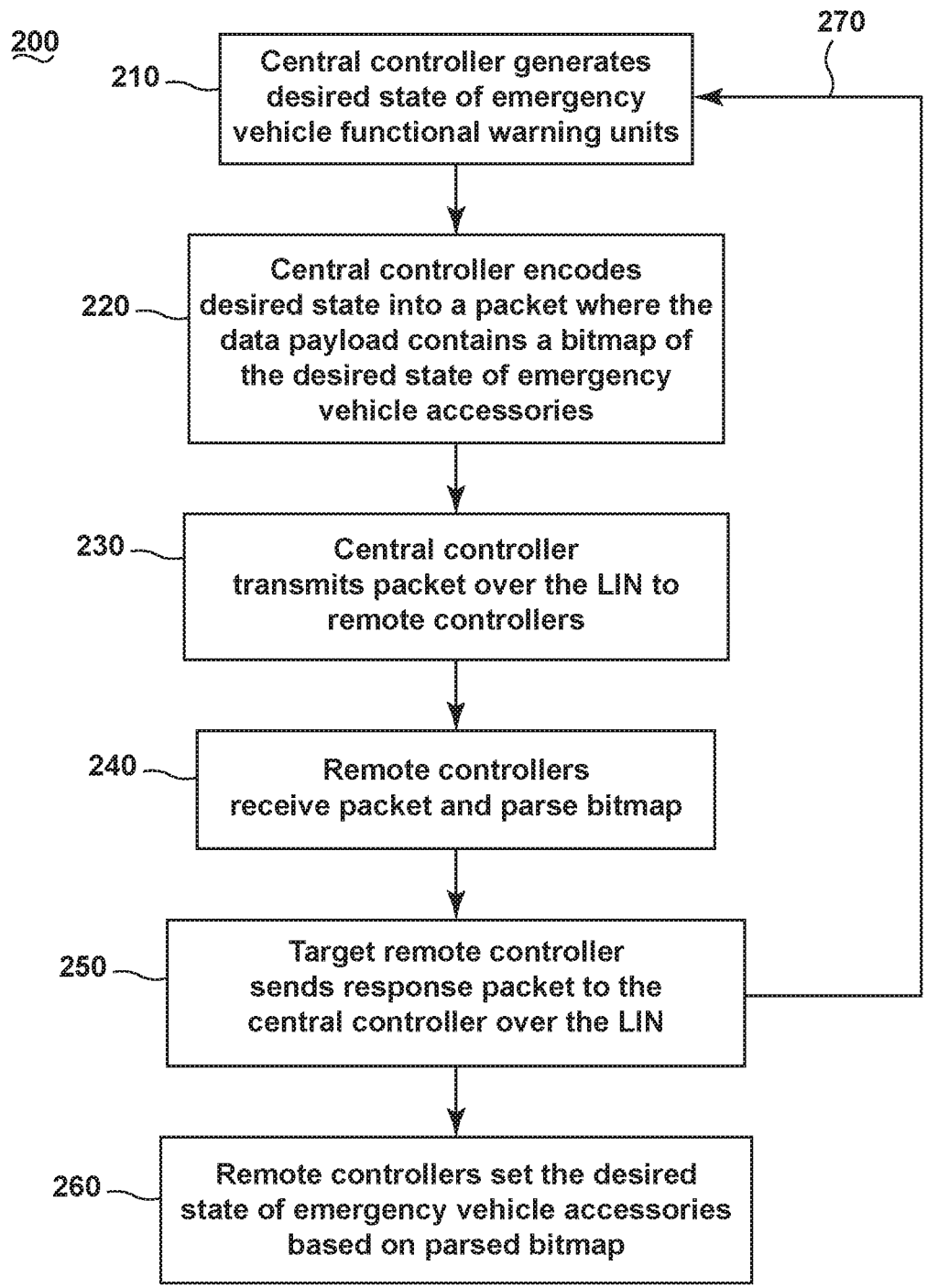
FIG. 4 is a flowchart showing communication between the central controller and the remote controllers for setting the desired state of vehicle functional warning units according to an embodiment of the invention.

Referring now to FIG. 4, the method of communicating the desired state of the vehicle 12 functional warning units 200 from the central controller 20 to the remote controllers 22 by the communication protocol according to the present invention will now be described. At the start of each data frame at step 210, the central controller 20 may generate the desired state of the vehicle 12 functional warning units connected to the central controller 20 by way of the LIN 24. The central controller may then encode at step 220 the desired state of the vehicle 12 functional warning units; that is, ON/OFF or powered/not powered, into the data payload of the packet as will be described below. The encoding of the desired state may be a bitmapped representation where each vehicle 12 functional warning unit's state will be assigned a 0 or 1. Then at step 230, the central controller 20 may transmit the packet over the LIN 24 to the remote controllers 22. At step 240, each of the remote controllers 22 may receive the packet and, generally, parse the packet and, more particularly, parse the bitmap representation of the desired state of the vehicle 12 functional warning units under the control of the remote controller 22. A target remote controller 22 may generate and send a response packet including an acknowledgement to the central controller 20 over the LIN 24 at step 250. Then, at step 260, the remote controllers 22 may set the current state of the vehicle 12 functional warning units based on the desired state encoded in the parsed bitmap. At 270, the response packet may be sent from the target remote controller 22 and received by the central controller 20 designating the completion of the current data frame and the beginning of the next data frame where the process may be repeated.

Each data packet formed according to the communications protocol may consist of a first byte that encodes the length of the packet in bytes, a second byte that encodes the target of the packet and the type of data encoded in the payload. The next sequence of bytes may encode the payload or actual data encoded in the packet. The last two bytes of the packet may encode a cyclic redundancy check (CRC). The CRC is a well-known error-detecting code used in digital networks to detect accidental changes to raw data and need not be described in more detail here.

Table 1 presents a tabular description of the structure of first byte of the communications protocol of the present invention. The first byte may encode the length of the packet in bytes.

TABLE 1

| Packet Length | | | | | | | |
| --- | --- | --- | --- | --- | --- | --- | --- |
| Bit 7 | Bit 6 | Bit 5 | Bit 4 | Bit 3 | Bit 2 | Bit 1 | Bit 0 |
| Encodes the total number of bytes in the packet | | | | | | | |

Table 2 presents a tabular description of the structure of the second byte of the communications protocol of the present invention. The target bit may be set to indicate the packet is being sent from the central controller 20 to one of the remote controllers 22 or being sent from one of the remote controllers 22 to the central controller 20. The module identifier in the final three bits may encode which remote controller 22 is transmitting or being targeted. The type or function of the data encoded in the payload may be described by the three function bits of the packet header.

TABLE 2

| Packet Header | | | | | | | |
| --- | --- | --- | --- | --- | --- | --- | --- |
| Bit 7 | Bit 6 | Bit 5 | Bit 4 | Bit 3 | Bit 2 | Bit 1 | Bit 0 |
| Target | Function | | | Module Identifier | | | |

Table 3 presents a tabular description of the packet structure of the communications protocol of the present invention. As described above, the packet encodes the length of the packet in bytes, the target and function of the packet, the data payload for the encoded function in a variable number of bytes and the CRC for detecting errors in the transmitted packet.

TABLE 3

| Packet Length | Packet Header | Payload | CRC |
| --- | --- | --- | --- |
| 1 byte | 1 byte | Variable bytes | 2 bytes |

One encoded function indicates the data payload is the output enabled state of every vehicle 12 functional warning unit connected to the modular networked signaling system. The data payload maps a single bit representative of a desired ON/OFF state for each vehicle 12 functional warning unit. In this way, a single output packet encodes the desired state of every functional warning unit connected to the networked signaling system in a bitmap. For a network with five remote controllers 24 where each remote controller 24 is coupled to ten functional warning units, information for all 50 outputs is encoded in less than seven bytes of data. Further, all of the remote controllers 24 may update the current state of each functional warning unit based on that data. Therefore, all system outputs may update at approximately the refresh rate of the data frame of the communications protocol. With a preferred implementation, the signaling system may update at approximately a rate of once every 10 ms. However, the refresh rate may ideally be selected to achieve the fastest output update rate and lowest input latency.

As described above, the target remote controller 22 may send a response packet to the central controller 20 over the LIN 24 in the data frame. The response packet may act as an acknowledgment of the data packet sent by the central controller 20. The data payload of the response packet may encode the current state of additional system inputs that are directly connected to the target remote controller 22. The state of the additional inputs may be encoded as one of many possible states. For example, an analog voltage level of an additional input may be digitized and encoded into the data payload of the response packet. In this way, the additional inputs connected to each remote controller 22 may be discretized and subject to digital signal processing techniques including, but not limited to, digital filtering. Other processing techniques including the use of programmable thresholds may be used to process the encoded signals indicative of the state of the additional inputs.

Additionally, the data payload of the response packet may encode faults detected on any of the functional warning units directly connected to the target remote controller 22. Other ancillary data may be transmitted back to the central controller 20 in the data payload of the response packet. For example, the temperature of the remote controller 22 may be sensed and then encoded into the data payload of the response packet. Any number of operational characteristics of the remote controllers 22, the functional warning units or even the vehicle 12 may be sensed and then encoded into the data payload of the response packet.

By bitmap encoding the desired state of every vehicle 12 functional warning unit on the modular networked control system 10, the central controller 20 may synchronize all of the devices, particularly the visual and audible warning devices such as the lightbar 26, siren 28 and perimeter lighting 42 to establish any coordinated signaling pattern desired or required for the particular vehicle 12. In this way, flash patterns for each lighting device may be encoded into the central controller 20 and may be easily reconfigurable. New patterns may be uploaded into the central controller 20 to adapt to flashing pattern requirements that may differ across regions.

Figure 5:
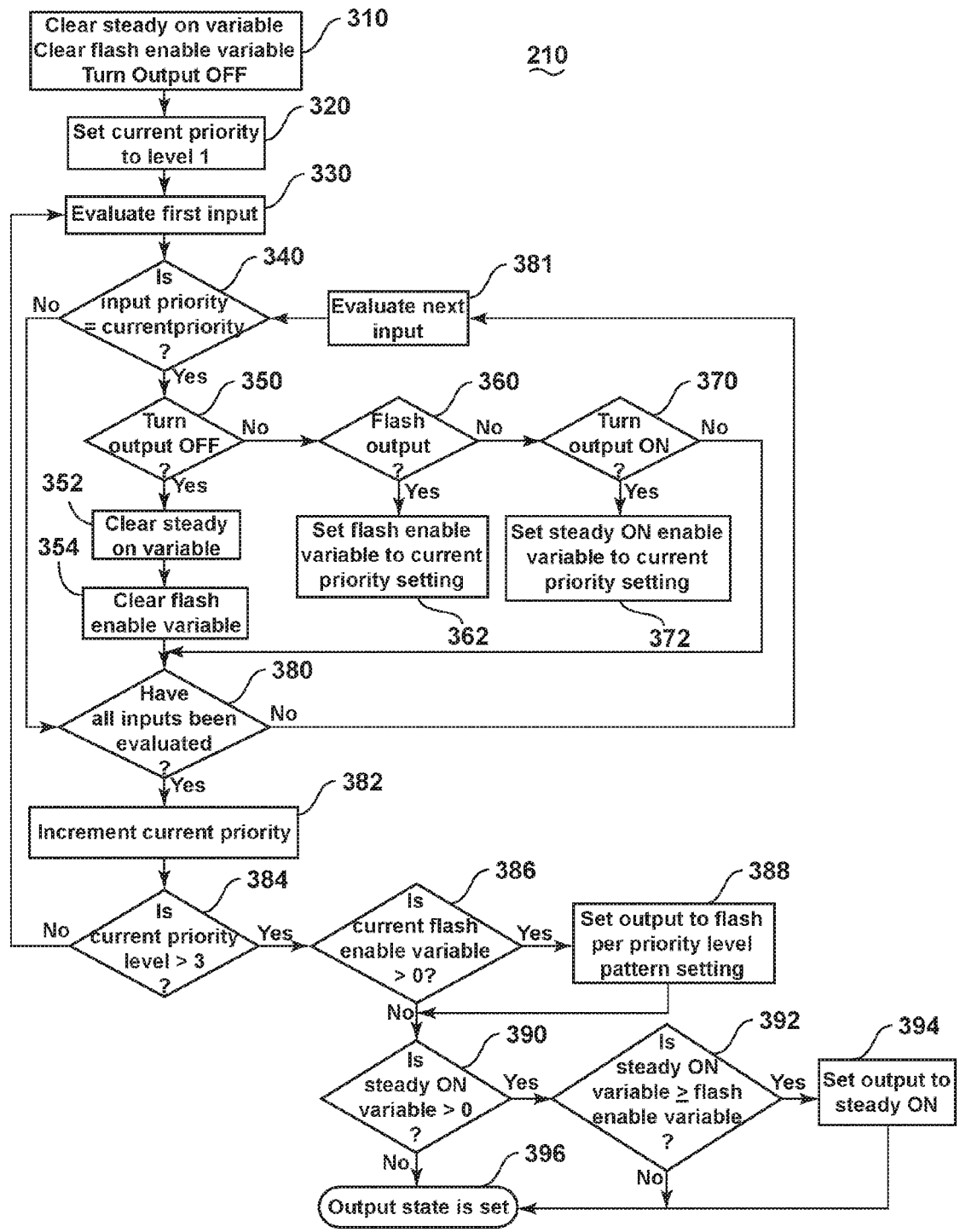
FIG. 5 is a flowchart showing a method the central controller may use to generate the desired state of vehicle functional warning units functional warning units according to an embodiment of the invention.

As previously discussed, at the start of each data frame at step 210, the central controller 20 may generate the desired state of the functional warning units connected to the central controller 20 by way of the LIN 24. Referring now to FIG. 5, a method for generating the state of functional warning units may now be described. The method may preferably be implemented and executed by the microcontroller 152 in the central controller 20 though other controlling elements may be implemented, for example, a software-based controller loaded into a personal computer or mobile device connected to the central controller 20. Initially, at step 310, the microcontroller 152 may clear the state of conditional variables referred to as the "steady on" and "flash enable" variables. As described below, these variables may encode desired behaviors of the functional warning units and may be set based in part on the state of various inputs.

At step 320, the microcontroller 152 may set the current priority to an initial level such as level one. Each input to the modular networked control system may be assigned a priority, for example, from one to three and the input may have one of two input states; ON or OFF, and may indicate one of three states for the output; ON, OFF or FLASH. The microprocessor 152 may then use the priority level of each input to order the processing of the inputs to determine the output state of the functional warning unit. The microprocessor may evaluate the first input at step 330 and may determine if the input's priority is the same as the current priority at step 340. If the input's priority is the same as the current priority then at step 350, the microprocessor 152 may determine if the output state should be turned OFF based upon the state of the input. If the output state, as determined by the input state, is not OFF, then at step 360, the microprocessor 152 may determine if the output state should be set to FLASH based upon the input. If, based upon the input state, the output is not FLASH, then at step 370, the microprocessor 152 may determine if the output state should be turned ON based upon the state of the input.

Based upon the decisions at steps 350, 360 and 370, the state of the steady on and flash enable variables may be updated. If the microprocessor, at step 350 determines that the output state should be turned OFF based upon the state of the input, then at step 352, the steady on variable may be cleared and at step 354, the flash enable variable may be cleared. If the microprocessor 152 determines that the output state should be set to FLASH based upon the state of the input, then, at step 362, the flash enable variable may be set to the current priority level, that is the priority level of the input. If the microprocessor 152 determines that the output state should be turned ON based upon the state of the input, then, at step 372, the steady on variable may be set to the current priority level that is the priority level of the input.

If, at step 340, the input's priority is not the same as the current priority or after evaluating the input's state and updating the relevant variables at any of steps 354, 362, 372 and 370, the microprocessor 152 may determine if all inputs to the control system have been evaluated. If not, then at step 381, the microprocessor 152 may evaluate the next input and proceed to the evaluating steps starting with determining if the input's priority is the same as the current priority at step 340. Upon evaluation of all the inputs, the microprocessor 152 may increment the current priority at step 382. The microprocessor, at step 384 may then determine if the current priority level exceeds the highest priority level of the system, for example a priority level greater than three. If the microprocessor determines at step 384 that the current priority level is less than or equal to the maximum priority level for the system, the evaluation of the inputs starting with evaluation of the first input at step 330 may be repeated for the current priority level.

When the microprocessor 152 determines at step 384 that the current priority level exceeds the highest priority level of the system, the microprocessor 152 may evaluate the flash enable variable at step 386. If the flash enable variable is greater than zero, the microprocessor 152, at step 388, may set the output state of the functional warning unit to flash per the flash pattern associated with the priority level encoded in the flash enable variable. If, at step 386, the flash enable variable is zero or after the output state of the functional warning unit is set to flash at step 388, the microprocessor 152, at step 390, may determine if the steady on variable is greater than zero. If the steady on variable is greater than zero, then at step 392, the microprocessor 152, may compare the values of the steady on and flash enable variables. If the steady on variable has the same or a higher value than the flash enable variable, then at step 394, the output state of the functional warning unit may be set to ON.

As described, the microprocessor 152 may determine the output state of the functional warning units based in part on the activated input with the highest priority. Table 4 presents an example set of inputs with their output state and priority level. Table 5 present four example scenarios to demonstrate the relationship between the output state and the priority of the inputs. Scenario 1 results in a FLASH output state because input three is ON and when input three is ON and has the highest priority of the inputs in the ON state, it directs an output state to be set to FLASH. Scenario 2 results in a FLASH output state because input six with a priority level of three is ON and set to FLASH. Scenario 3 results in an OFF output state because input five with a priority level two is ON and directs an output of an OFF state. Scenario 4 results in a FLASH output state because input three with a priority level two is ON and set direct an output to a FLASH output state.

TABLE 4

| | Input Number | | | | | | | | |
|---|---|---|---|---|---|---|---|---|---|
| | 1 | 2 | 3 | 4 | 5 | 6 | 7 | 8 | 9 |
| Output state | ON | OFF | FLASH | ON | OFF | FLASH | ON | OFF | FLASH |
| Priority Level | 1 | 1 | 2 | 2 | 2 | 3 | 3 | 1 | 1 |

TABLE 5

| | Input Number | | | | | | | | |
|---|---|---|---|---|---|---|---|---|---|
| | 1 | 2 | 3 | 4 | 5 | 6 | 7 | 8 | 9 |
| Scenario 1—Resulting Output FLASH | | | | | | | | | |
| Input State | ON | ON | ON | OFF | OFF | OFF | OFF | OFF | OFF |
| Scenario 2—Resulting Output FLASH | | | | | | | | | |
| Input State | ON | ON | ON | ON | ON | ON | OFF | ON | ON |
| Scenario 3—Resulting Output OFF | | | | | | | | | |
| Input State | ON | ON | OFF | OFF | ON | OFF | OFF | OFF | OFF |

TABLE 5-continued

| | | | | Input Number | | | | |
|---|---|---|---|---|---|---|---|---|
| 1 | 2 | 3 | 4 | 5 | 6 | 7 | 8 | 9 |
| Scenario 4—Resulting Output FLASH | | | | | | | | |
| Input State ON | OFF | ON | OFF | OFF | OFF | OFF | ON | OFF |

If the value of the steady on variable at step 390 is greater than zero and also greater than the flash enable variable then the output is encoded to ON at step 394. The microprocessor 152 may then encode the output state at step 396 for the data payload of the packet to be sent by the central processor 20 in step 220 of the communication protocol described in FIG. 4. As previously described, the encoding scheme for output states encoded in the data payload of the packet to be sent via the LIN 24 to the remote controllers 22 allows for bitmapped encoding of ON/OFF states. When an output state at step 396 is set to FLASH, the microprocessor 152 may further encode the output state by an additional process that encodes the flash pattern for the output based on the priority level of the relevant input. The microprocessor at step 392 may determine if a particular FLASH output state should be encoded into the data payload of a packet as ON or OFF based on a timed sequence of steps that determine the flash pattern. In this way, the flash pattern is a series of instructions in the microprocessor that may encode a flash pattern as a predetermined sequence of ON and OFF states as a sequence output. For example, a FLASH output may result in one set of functional warning units being cycled from ON to OFF every 5 data frames while a second set of the vehicle's 12 functional warning units are cycled from ON to OFF for 5 data frames and then from OFF to ON for 2 data frames. Consequently, the temporal resolution for the generated flash patterns is synchronized with the data frame rate, for example 10 ms. Therefore, the central controller 20 may simply send an ON or OFF value to the remote controller 22 for each output functional warning unit when in FLASH mode.

The central controller 20 may have multiple flash patterns programmed into the microprocessor 152. The method to generate the output states may be applied to determine the output state of each functional warning unit individually or en masse depending upon the desired implementation. Additionally, the method may be triggered by one of many conditions, including the detection of a changed state of an input. Other triggers may include those based on timers or other external sensors. The system and method described above may include the capacity to handle complex input matrix triggers. For example, the system may handle multiple inputs by processing Boolean logic statements assembled based upon the state of the system and the set of inputs to the system.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method for controlling functional warning units on a vehicle containing multiple functional warning units that are controlled by a central controller and multiple remote controllers remote from the central controller that are connected to the controller and to the functional warning units, the method comprising:
   generating an input relating to a desired state of the functional warning units in the central controller;
   encoding the desired state of the functional warning units into a packet in the central controller;
   transmitting the encoded packet from the central controller to each of the remote controllers across a network wherein each remote controller is functionally connected to at least one of the functional warning units;
   parsing the desired state of each of the functional warning units in the encoded packet at each of the remote controllers; and
   setting the desired state of each of the functional warning units at the remote controllers based on the parsed encoded packet;
   wherein the central controller is configured as a single master node and the one or more remote controllers are configured as slave nodes on the network and wherein the step of encoding the desired state into a packet includes embedding into the packet a data payload that contains a bitmap of the desired state of the functional warning units.

2. A method for controlling functional warning units on a vehicle containing multiple functional warning units that are controlled by a central controller and multiple remote controllers remote from the central controller that are connected to the controller and to the functional warning units, the method comprising:
   generating an input relating to a desired state of the functional warning units in the central controller;
   encoding the desired state of the functional warning units into a packet in the central controller;
   transmitting the encoded packet from the central controller to each of the remote controllers across a network wherein each remote controller is functionally connected to at least one of the functional warning units;
   parsing the desired state of each of the functional warning units in the encoded packet at each of the remote controllers; and
   setting the desired state of each of the functional warning units at the remote controllers based on the parsed encoded packet;
   wherein the central controller is configured as a single master node and the one or more remote controllers are configured as slave nodes on the network and wherein encoding the desired state of the functional warning units into a packet includes encoding a flash pattern for one or more functional warning units as a predetermined sequence of ON and OFF states in consecutive packets.

3. The method of claim 2 wherein the act of generating the state of the functional warning units includes providing an input from a user to the central controller.

4. The method of claim 2 wherein the act of generating the desired state of the functional warning units includes providing multiple inputs to the central controller.

5. The method of claim 4 wherein the act of generating the desired state of the functional warning units includes prioritizing the one or more inputs.

6. The method of claim 4 where at least one of the multiple inputs includes an input from a second vehicle.

7. The method of claim 2 wherein the transmitting act is repeated at a predetermined frame rate.

8. The method of claim 2 wherein the transmitting act takes place over a local interconnect network (LIN).

9. The method of claim 2 wherein the transmitting act takes place over a wireless network.

10. An vehicle control system comprising:
one or more functional warning units positioned in various positions in an vehicle;
a central controller configured to generate a desired state of the functional warning units and encode the desired state into a packet and encode a flash pattern for the one or more functional warning units as a predetermined sequence of ON and OFF states in consecutive packets;
multiple remote controllers, each of which is functionally connected to at least one of the functional warning units; and
a functional connection between the central controller and the multiple remote controllers and configured to transmit the encoded packet from the central controller to each of the remote controllers wherein the functional connection is a network and the central controller is configured as a single master node and the multiple remote controllers are configured as slave nodes on the network;
wherein the remote controllers are configured to parse the desired state of each of the functional warning units in the encoded packet and set the state of each of the functional warning units based on the parsed encoded packet.

11. The system of claim 10 wherein the functional warning units include one or more lightbars, headlights, taillights, alley lights, gun locks, horns, perimeter lighting, or sirens.

12. The system of claim 10 wherein the connection is a local interconnect network (LIN).

13. The system of claim 10 wherein the connection includes a single network bus.

14. The system of claim 10 wherein the central controller is further configured to be responsive to one or more inputs to set the current state of the functional warning units.

15. The system of claim 14 where the inputs include a human-machine interface (HMI) and the current state of the ignition switch.

16. The system of claim 14 where the inputs include the current state of at least one of the functional warning units.

17. The system of claim 14 wherein the central controller is further configured to prioritize the one or more inputs.

18. The system of claim 10 wherein the central controller includes a solid-state switching device configured to detect one or more of an over voltage condition, an over current condition, an open load condition, and an over temperature condition.

* * * * *